United States Patent
Guo

(10) Patent No.: US 12,164,415 B2
(45) Date of Patent: Dec. 10, 2024

(54) REMOTE DEBUGGING OF LOCAL GUI RENDERING BY PLAYING BACK A CAPTURE FILE TO RECREATE A REAL-TIME LOCAL NETWORK ENVIRONMENT

(71) Applicant: Fortinet, Inc., Sunnyvale, CA (US)

(72) Inventor: Kai Guo, Langley (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 17/855,784

(22) Filed: Jun. 30, 2022

(65) Prior Publication Data

US 2024/0004782 A1   Jan. 4, 2024

(51) Int. Cl.
G06F 9/44      (2018.01)
G06F 11/36     (2006.01)

(52) U.S. Cl.
CPC ...... *G06F 11/3664* (2013.01); *G06F 11/3696* (2013.01)

(58) Field of Classification Search
None
See application file for complete search history.

(56) References Cited

U.S. PATENT DOCUMENTS

| | | | |
|---|---|---|---|
| 8,201,149 B1* | 6/2012 | Gumtow | G06F 11/3664 717/124 |
| 2010/0172624 A1* | 7/2010 | Watts | H04N 5/77 715/810 |
| 2018/0137025 A1* | 5/2018 | Zhang | G06F 8/38 |
| 2019/0272206 A1* | 9/2019 | Tsai | G06F 11/362 |
| 2022/0091726 A1* | 3/2022 | Azmoon | G06F 9/451 |
| 2022/0329510 A1* | 10/2022 | Barrett | H04L 43/106 |

* cited by examiner

*Primary Examiner* — Qamrun Nahar
(74) *Attorney, Agent, or Firm* — Law Office of Dorian Cartwright; Dorian Cartwright

(57) ABSTRACT

Debug engine receives a capture file over the network interface and initiate playback by executing the capture file with the processor. The capture file comprises real-time local network environment video synchronized with data captured by a local browser at a local station interacting with a local network gateway device over a local network. The capture file is played back, using a mock server including transmitting HTTP requests from the capture file at the developer station to the mock gateway server. Additionally, HTTP responses are received from the capture file at the mock gateway server, in synch with actions in the real-time local network environment video. A GUI engine renders a GUI on the developer computer from real-time GUI code generated from the capture file playback as modified by processing the HTTP responses.

16 Claims, 6 Drawing Sheets

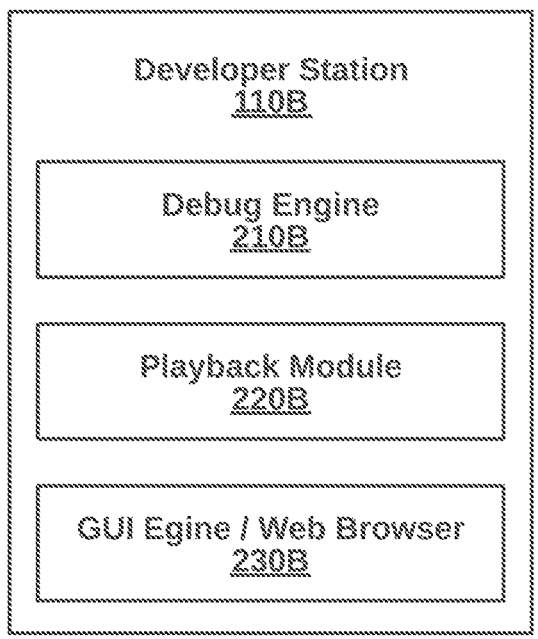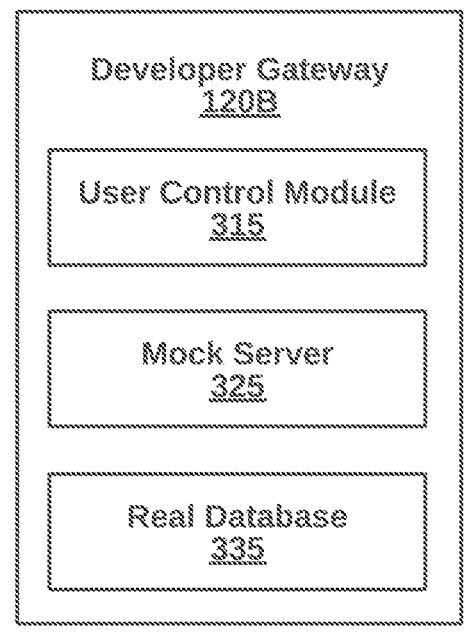
FIG. 3A
FIG. 3B

REMOTE DEBUGGING OF LOCAL GUI RENDERING BY PLAYING BACK A CAPTURE FILE TO RECREATE A REAL-TIME LOCAL NETWORK ENVIRONMENT

FIELD OF THE INVENTION

The invention relates generally to computers and computer networking, and more specifically, for remote debugging of local graphical user interface (GUI) rendering by playing back a capture file to recreate a real-time local network environment.

BACKGROUND

While interacting with a network resource (e.g., in the form of a remote computer system, a user interface or other application running on the remote computer system, or a web application), which may include software, hardware or a combination of both, via a web browser running on a local computer system, an end user may encounter an issue with the network resource that the end user would like to report to appropriate stakeholders (e.g., a local information technology (IT) administrator or a development team or technical support personnel of a manufacturer, distributer or service provider of the network resource). Typically, reporting issues to technical support services involves making a call or opening a technical support case via a technical support portal.

In order, for developers to identify and fix a problem in a timely fashion, it is helpful to have a variety of types of debugging information. In most cases today, multiple back and forth communications may be required among various of the stakeholders (e.g., the customer, customer support staff, quality assurance team members, and developers) asking for more information, better screenshots/videos, different debug logs, etc. More often than not, needed information is missing, or captured at the incorrect time. Meanwhile, even after all the desired information is gathered, it can be difficult to correlate it all together.

Therefore, what is needed is a robust technique for remotely debugging a local GUI rendering by playing back a capture file to recreate a real-time local network environment.

SUMMARY

These shortcomings are addressed by the present disclosure of methods, computer program products, and systems for remotely debugging a local GUI rendering by playing back a capture file to recreate a real-time local network environment.

In one embodiment, a debug engine receives a capture file over the network interface and initiate playback by executing the capture file with the processor. The capture file, in one case, comprises real-time local network environment video synchronized with data captured by a local browser at a local station interacting with a local network gateway device over a local network. In response, a mock gateway server with HTTP responses is initiated. The local network gateway manages network devices on a local network.

In another embodiment, the capture file is played back, including transmitting HTTP requests from the capture file at the developer station to the mock gateway server. Additionally, HTTP responses are received from the capture file at the mock gateway server, in synch with actions in the real-time local network environment video. A GUI engine renders a GUI on the developer computer from real-time GUI code generated from the capture file playback as modified by processing the HTTP responses. One embodiment includes an ASIC or specialized network security processor for optimization. The debug engine identifies at least one bug in the real-time GUI code during rendering of the GUI for reporting. Various types of remediation can correct the bug, depending on specific implementations.

Advantageously, performance of a network computer device is improved with more accurate debugging. Additionally, performance of a computer network is improved with more reliable network devices.

BRIEF DESCRIPTION OF THE DRAWINGS

In the following drawings, like reference numbers are used to refer to like elements. Although the following figures depict various examples of the invention, the invention is not limited to the examples depicted in the figures.

FIGS. 3A, 3B are more detailed block diagrams illustrating components of the developer network of the system of FIG. 1, according to an embodiment.

DETAILED DESCRIPTION

The description below provides methods, computer program products, and systems for remotely debugging a local GUI rendering by playing back a capture file to recreate a real-time local network environment.

One of ordinary skill in the art will recognize many additional variations made possible by the succinct description of techniques below.

I. Systems for Playing Back Remote GUI Rendering (FIGS. 1-3)

Figure 1:
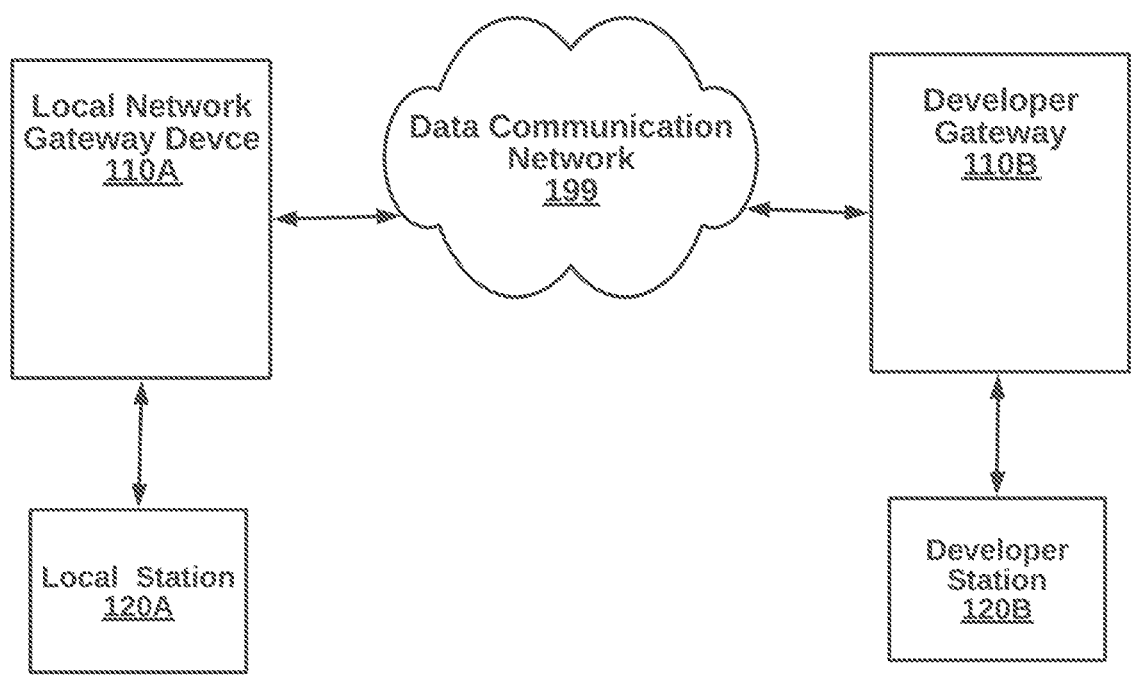
FIG. 1 is a block diagram illustrating a system for remotely debugging a local GUI rendering by playing back a capture file to recreate a real-time local network environment, according to an embodiment.

FIG. 1 is a block diagram illustrating a system 100 for session-aware load balancing of data packets across the multiple processing blades for remotely debugging a local GUI rendering by playing back a capture file to recreate a real-time local network environment, according to an embodiment. The system 100 includes a local network gateway device 110A and a local station 120A, and a developer network gateway device 110B and a developer station 120B, coupled to a data communication network 199. Many other configurations are possible, for example, with additional network components such routers, switches, repeaters, firewalls, and the like. Also, there can be many more or fewer clients in FIG. 1. The system components can be implemented in computer devices with non-transitory source code, such as set forth below with reference to FIG. 6.

The components of the system 100 are coupled in communication over the data communication network. The components can be connected to the data communication system via hard wire. The data communication network 199 can be any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802, 11r, and the like. Components can use IPV4, IPV6 or other network address spaces.

The developer station 120B identifies bugs by remotely recreating a real-time user environment with a capture file received from the local station 120A. An extension to a browser executing on the developer station 120B opens the capture file for implementation, as described herein. A GUI or other graphical interface on the browser can be implemented in JavaScript or another platform and display from the developer network gateway 110B. The HTTP responses received can include API with code for updating the GUI. Bugs from the real-time local environment are reproduced for analysis and resolution. In a non-limiting embodiment, buttons can be activated for starting a capture file and stopping a capture file. In another embodiment, capture files are automatically handled by master processes.

The developer network gateway runs a mock web server in communication with the developer station 120B. The HTTP requests are processed and HTTP responses are sent back. One embodiments of HTTP requests and responses include APIs for controlling the developer network gateway 110B. To process HTTP requests, network logs from the capture file are checked for a real-time response. If there is no match, a database is accessed for information to include in the response.

The local station 120A can also include an extension to a web browser. A GUI permits a user to monitor and control the local network gateway station 110A. Source code from rendering the GUI may have bugs. The real-time environment spawning the bug can be packed into a capture file. Buttons can be created in a toolbar of the web browser for starting and stopping debug capture. Furthermore, data is collected from the perspective of the web browser in actual interactions with network resources. The data, along with video of GUI interactions can then be compressed into a capture file. The local station 120A transmits the capture file to the developer station 120B, where the real-time environment is implemented.

The local network gateway 110A manages enterprise network devices in many different aspects. The local station 120A is able to visualize results on the web browser. For example, a network architecture can be visually represented with symbols for each network device. Various data can be displayed near the symbol to characterize network status, specific connections with other network devices, and internal conditions of the device (e.g., processing load and memory usage). To collect the data, in some embodiments, the local network gateway 110A observes Wi-Fi data packets being sent. In other embodiments, a daemon running on the network devices collects information and sends it upstream to the local network gateway 110A.

Relative to the local station 130 situated lower in the network hierarchy than the local network gateway device 110A, the developer station 110 is situated higher in the network hierarchy than the developer station 120B. This is because the developer gateway 110B is under the control of the developer station 120B for setting up mock environments of local networks. In some embodiments, there may be a gateway in the network of the developer station 110B that performs standard gateway functions.

The local station 120A although lower in the network hierarchy is used to access the local network gateway device 110A. For example, the local station 120A can be a laptop, a PC, a mobile computing device, a smartphone, or the like. The local station 120A runs a browser, and in some embodiments, a browser extension. In one embodiment, users access graphical interfaces to view, without limitation, network architecture, network status, number of stations connected to access points, number of access points connected to Wi-Fi controllers, network issues, network logs, access credentials, and the like. An extension can be downloaded to a web browser, such as Google Chrome, Microsoft Edge, or Apple Safari.

Figure 2A:
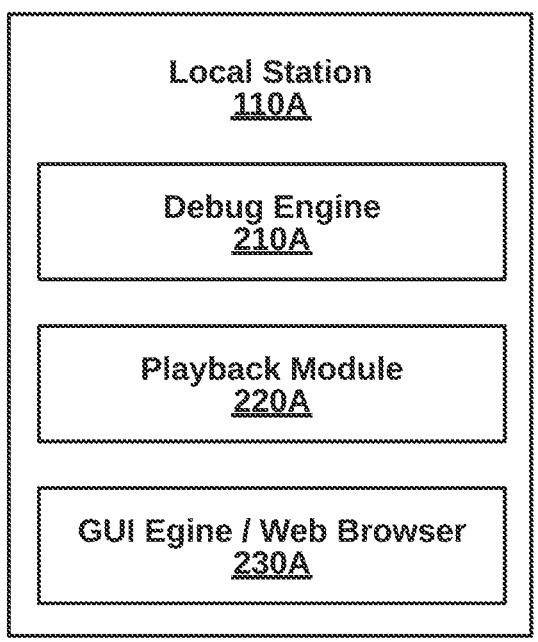
FIGS. 2A, 2B are more detailed block diagram illustrating components of the local network of the system of FIG. 1, according to an embodiment.
Figure 2B:
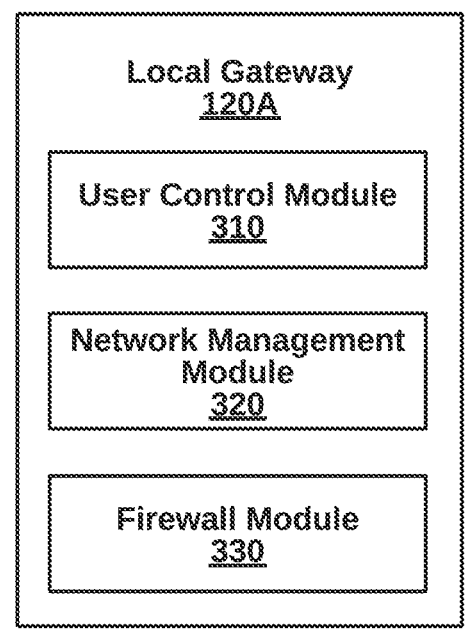

FIGS. 2A and 3A is a more detailed block diagram illustrating a local station 110A and developer station 110B of the system 100 of FIG. 1, according to an embodiment. The local network gateway device 110A includes a debug engine 210A, a playback module 220A, and a GUI engine 230A. FIGS. 2A and 2B is a more detailed block diagram illustrating a local gateway 120A with a user control module 310, a network management module 320 and a firewall module 330 and a developer gateway 120B with a user control module 315, a mock server 325 and a real database 335. The modules can be implemented in source code stored in non-transitory memory executed by a processor. Alternatively, the modules can be implemented in hardware with microcode. The modules can be singular or representative of functionality spread over multiple components. Many other variations are possible.

The debug engine 210A, B receive a capture file over the network interface and initiate playback by executing the capture file with the processor, comprising configuring a mock gateway server with HTTP responses. The capture file comprises real-time local network environment video synchronized with data captured by a local browser at a local station interacting with a local network gateway device over a local network. The local network gateway manages network devices on a local network. The debug engine 210A can perform local debugging and cooperate with the debug engine 210B.

The playback module 220A, B plays back the capture file, including transmitting HTTP requests from the capture file at the developer station to the mock gateway server. HTTP responses are received from the capture file at the mock gateway server, in synch with actions in the real-time local network environment video. The playback module 220A may create capture files at the local network.

The GUI engine 230A, B to render a GUI on the developer computer from real-time GUI code generated from the capture file playback as modified by processing the HTTP responses. One example of a GUI engine 230 with display is a web browser. The debug engine 210 identifies at least one bug in the real-time GUI code during rendering of the GUI for reporting. The GUI engine 230A, B provides a graphical display of user interactions in real time at 230A and in simulated real time at 230B.

II. Methods for Playing Back Remote GUI Rendering (FIGS. 4-5)

Figure 4:
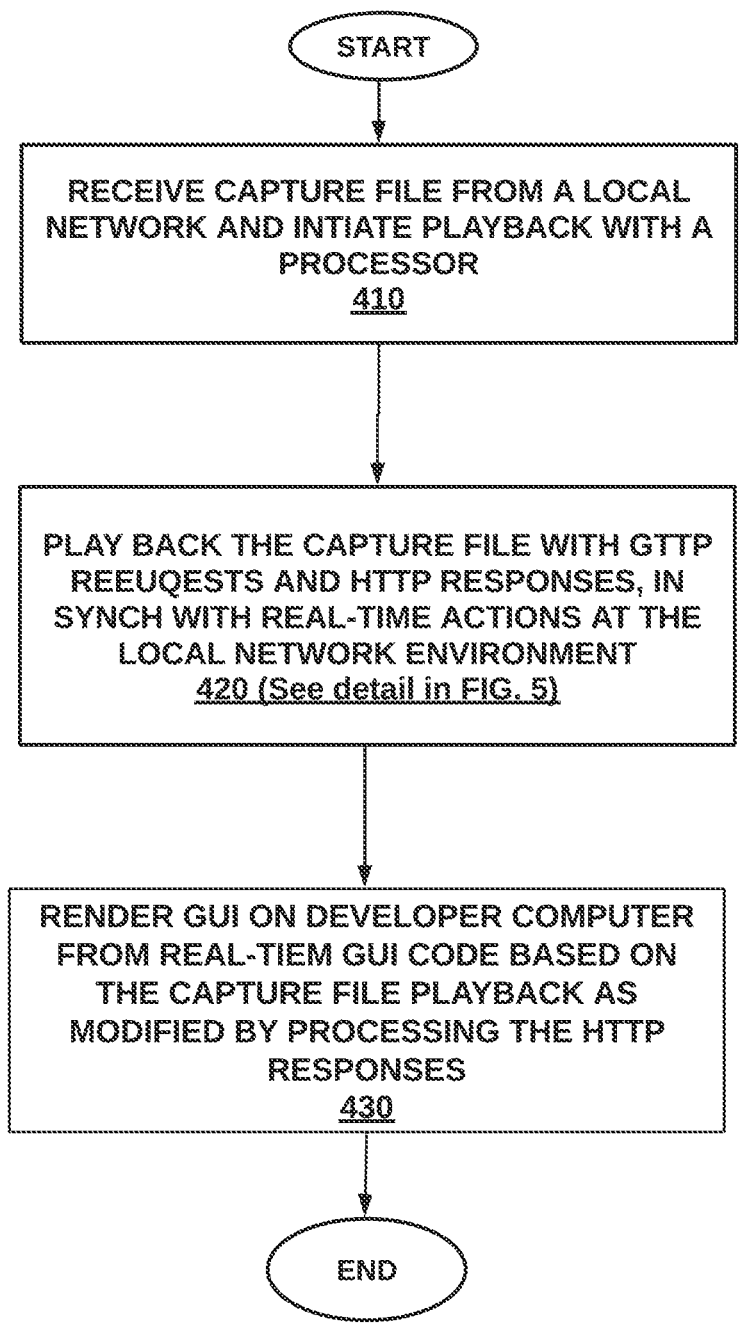
FIG. 4 is a high-level flow diagram illustrating a method for remotely debugging a local GUI rendering by playing back a capture file to recreate a real-time local network environment, according to one preferred embodiment.
Figure 5:
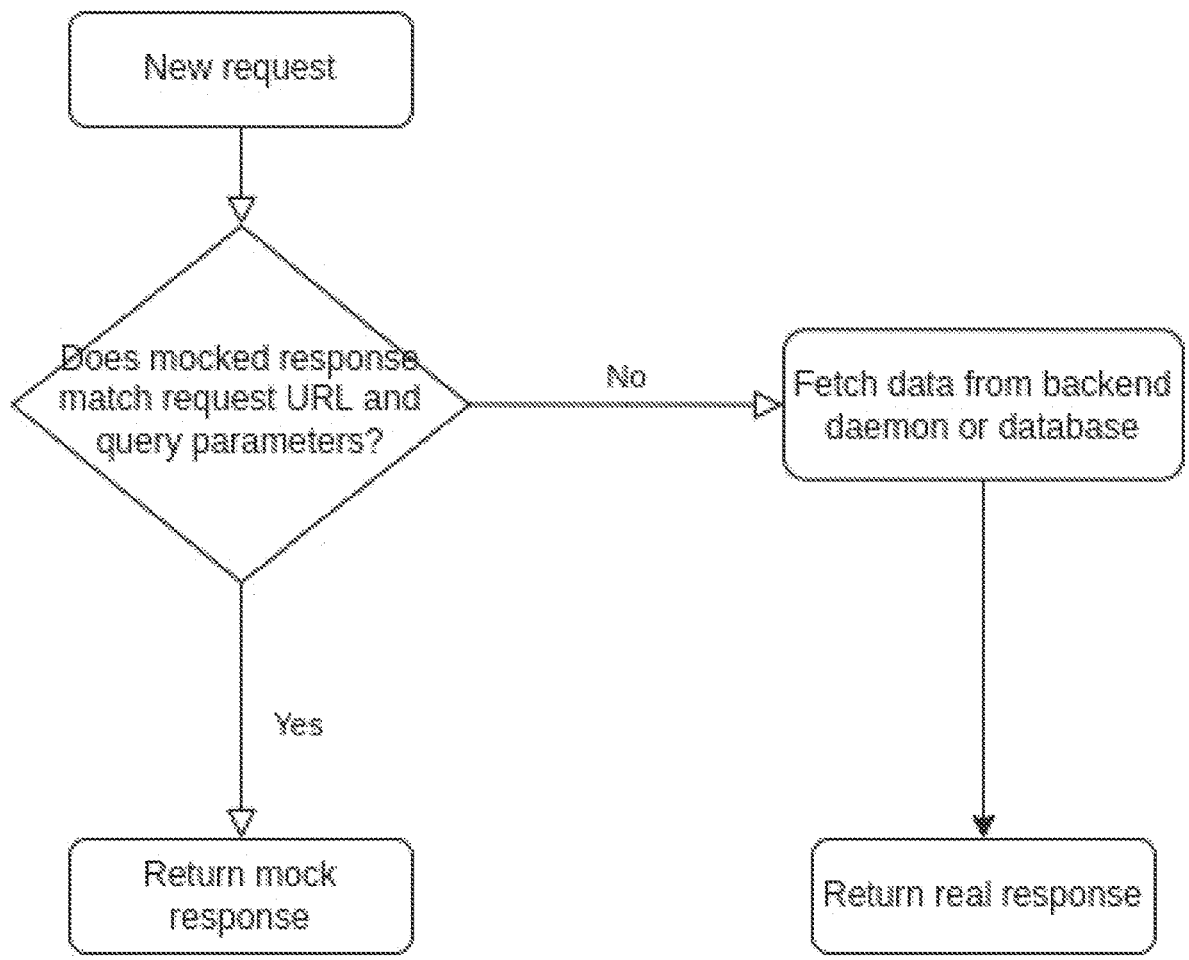
FIG. 5 is a more detailed flow diagram illustrating a one example of playing back the capture file at a mock server, for the method of FIG. 4, according to one embodiment.

FIG. 4 is a high-level flow diagram illustrating a method for remotely debugging a local GUI rendering by playing back a capture file to recreate a real-time local network environment, according to one preferred embodiment. The method 400 can be implemented, for example, by the network gateway device 110 of system 100. The steps are merely representative groupings of functionality, as there can be more or fewer steps, and the steps can be performed in different orders. Many other variations of the method 400 are possible.

At step 410, a capture file is received over the network interface and initiate playback by executing the capture file with the processor. The capture file comprises, in one embodiment, mock gateway server with HTTP responses, wherein the capture file comprises real-time local network environment video synchronized with data captured by a local browser at a local station interacting with a local network gateway device over a local network, wherein the local network gateway manages network devices on a local network.

At step 420, the capture file is played back, including transmitting HTTP requests from the capture file at the developer station to the mock gateway server and receiving HTTP responses from the capture file at the mock gateway server, in synch with actions in the real-time local network environment video.

At step 430, a GUI is rendered on the developer computer from real-time GUI code generated from the capture file playback as modified by processing the HTTP responses. The debug engine can identify at least one bug in the real-time GUI code during rendering of the GUI for reporting.

One example of step 420 is shown in detail in FIG. 5. In more detail, for a new request, if a mocked response matches a URL from the new request and query parameters, the mock response is returned. If there is no match, data is fetched from a backend daemon or database, and a real response is returned.

III. Generic Computing Environment (FIG. 6)

Figure 6:
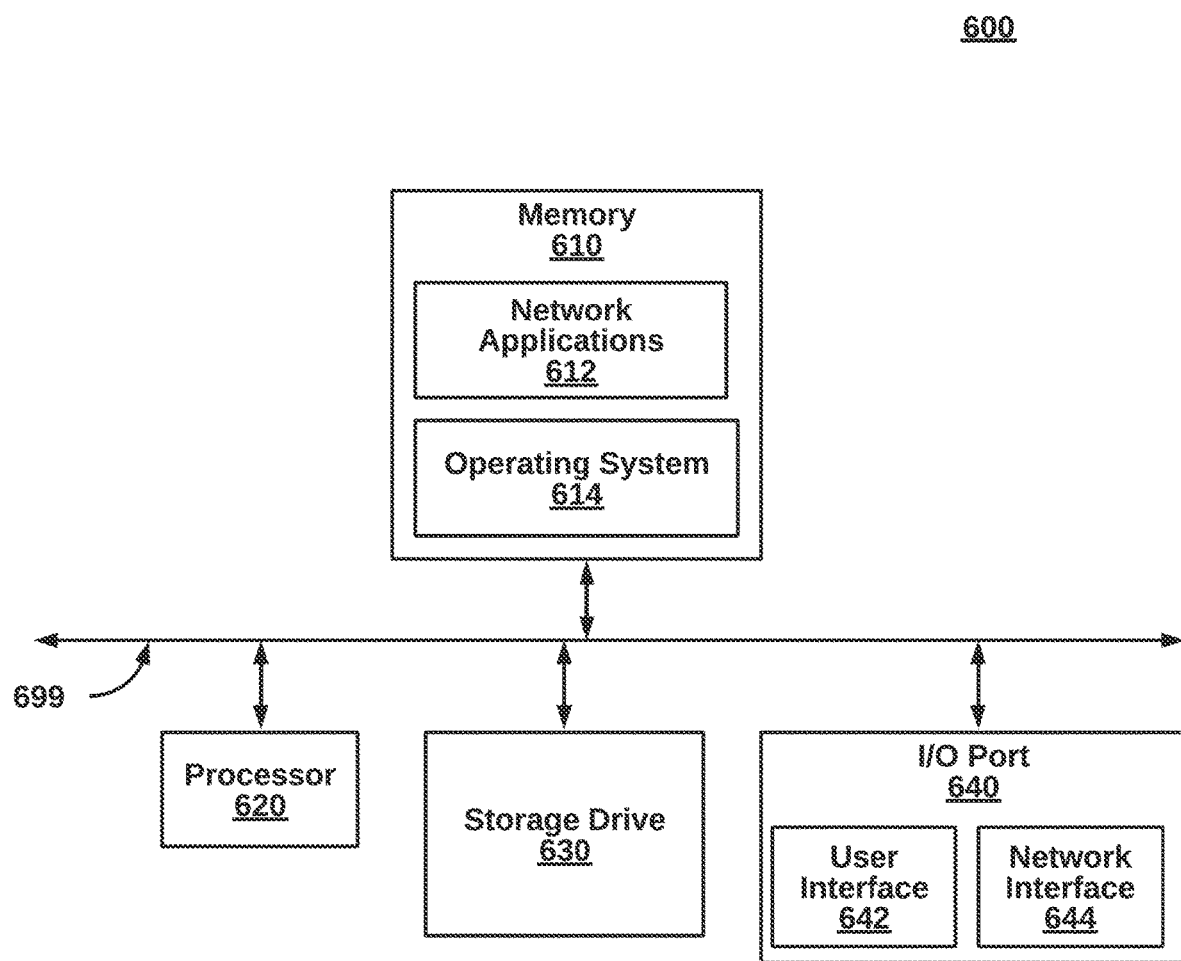
FIG. 6 is a high-level block diagram illustrating a computing device as an example hardware implementation of network devices herein, according to an embodiment.

FIG. 6 is a block diagram illustrating a computing device 600 capable of implementing components of the system, according to an embodiment. The computing device 600 of the present embodiment, includes a memory 610, a processor 620, a storage drive 630, and an I/O port 640. Each of the components is coupled for electronic communication via a bus 699. Communication can be digital and/or analog and use any suitable protocol. The computing device 600 can be any of components of the system 100 (e.g., the local network gateway device 110A, the remote network gateway device 110B, the local access point 120A, the remote access point 120B, the local station 130A, and the remote station 130B), other networking devices (e.g., an access point, a firewall device, a gateway, a router, or a wireless station), or a disconnected device.

Network applications 612 (e.g., the load balancing engine 112) can be network browsers, daemons communicating with other network devices, network protocol software, and the like. An operating system 614 within the computing device 600 executes software, processes. Standard components of the real OS environment 614 include an API module, a process list, a hardware information module, a firmware information module, and a file system. The operating system 614 can be FORTIOS, one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IPsec, Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A developer station, implemented at least partially in hardware, for remotely debugging a local graphical user interface (GUI) rendering by playing back a capture file to recreate a real-time local network environment, the developer station comprising:
   a processor;
   a network interface communicatively coupled to the processor and communicatively coupled to exchange data packets over a data communication network; and
   a memory communicatively coupled to the processor and storing:
      a debug engine to receive the capture file over the network interface and initiate playback by executing the capture file with the processor, comprising configuring a mock gateway server with HTTP responses, wherein the capture file comprises real-time local network environment video synchronized with data captured by a local browser at a local station interacting with a local network gateway device over a local network, wherein the local network gateway device manages network devices on the local network;
      a playback module to playback the capture file, including transmitting HTTP requests from the capture file at the developer station to the mock gateway server and receiving HTTP responses from the capture file at the mock gateway server, in synch with actions in the real-time local network environment video;
      a GUI engine to render a GUI on the developer station from real-time GUI code generated from the capture file playback as modified by processing the HTTP responses,
      wherein the debug engine identifies at least one bug in the real-time GUI code during rendering of the GUI for reporting.

2. The developer station of claim 1, wherein; the mock gateway server comprises a web server receives an HTTP request with a URL and query parameters of the HTTP requests and determines whether the capture file includes an HTTP response for the HTTP request, and transmits a mock response responsive to a match and transmits a real response formed from data fetched from a backend daemon or database responsive to no match.

3. The developer station of claim 1, wherein the memory further comprises a reporting module to generate a debugging report with the at least one bug for the real-time GUI code.

4. The developer station of claim 1, wherein the GUI engine identifies an action of a user from the real-time local environment video, and automatically recreates the user action on the developer station GUI.

5. The developer station of claim 4, wherein the user action results in at least a portion of the HTTP requests.

6. The developer station of claim 1, wherein at least one of the HTTP requests concerns a first access point and at least one of the HTTP requests concerns a second access point.

7. The developer station of claim 1, wherein the GUI concerns network devices managed by the local gateway device.

8. The developer station of claim 7, wherein the network devices comprise at least one of: a switch, an access point, and a Wi-Fi controller.

9. The developer station of claim 1, wherein the local station browser comprises a capture start button to receive user input to initiate capturing to the playback file.

10. The developer station of claim 1, where the developer station browser comprises a playback start button to receive user input to initiate playback of the playback file.

11. The developer station of claim 1, wherein the developer station automatically initiates generation of the capture file at the local station browser.

12. The developer station of claim 1, wherein remote debugging is performed for a plurality of local network gateways residing in different local area networks remote from the developer station.

13. The developer station of claim 1, wherein the developer station and the local network gateway are both located on the local area network.

14. The developer station of claim 1 wherein the collection file is generated and executed responsive to a flag concerning a specific network device.

15. A method in a developer station, implemented at least partially in hardware, for remotely debugging a local graphical user interface (GUI) rendering by playing back a capture file to recreate a real-time local network environment, the method comprising the steps of:
   receiving the capture file over the network interface and initiate playback by executing the capture file with a processor, comprising configuring a mock gateway server with HTTP responses, wherein the capture file comprises real-time local network environment video synchronized with data captured by a local browser at a local station interacting with a local network gateway device over a local network, wherein the local network gateway device manages network devices on the local network;

playing back the capture file, including transmitting HTTP requests from the capture file at the developer station to the mock gateway server and receiving HTTP responses from the capture file at the mock gateway server, in synch with actions in the real-time local network environment video;

rendering a GUI on the developer station from real-time GUI code generated from the capture file playback as modified by processing the HTTP responses; and identifying at least one bug in the real-time GUI code during rendering of the GUI for reporting.

16. A method in a non-transitory computer-readable media in a developer station, implemented at least partially in hardware, for remotely debugging a local graphical user interface (GUI) rendering by playing back a capture file to recreate a real-time local network environment, the method comprising the steps of:

receiving the capture file over the network interface and initiate playback by executing the capture file with a processor, comprising configuring a mock gateway server with HTTP responses, wherein the capture file comprises real-time local network environment video synchronized with data captured by a local browser at a local station interacting with a local network gateway device over a local network, wherein the local network gateway device manages network devices on the local network;

playing back the capture file, including transmitting HTTP requests from the capture file at the developer station to the mock gateway server and receiving HTTP responses from the capture file at the mock gateway server, in synch with actions in the real-time local network environment video;

rendering a GUI on the developer station from real-time GUI code generated from the capture file playback as modified by processing the HTTP responses; and identifying at least one bug in the real-time GUI code during rendering of the GUI for reporting.

* * * * *